United States Patent

[11] 3,633,476

[72] Inventors: Mutsunobu Yazaki, Yokohama-shi; Takashi Uchiyama, Tokyo, both of Japan
[21] Appl. No.: 820,988
[22] Filed: May 1, 1969
[45] Patented: Jan. 11, 1972
[73] Assignee: Cannon Kabushiki Kaisha, Tokyo, Japan
[32] Priority: May 9, 1968
[33] Japan
[31] 43/38015

[54] AUTOFLASH SWITCHING DEVICE FOR CAMERA
4 Claims, 7 Drawing Figs.

[52] U.S. Cl. .................................................. 95/11 R, 95/10 C, 95/11.5
[51] Int. Cl. .................................................. G03b 15/03
[50] Field of Search ...................................... 95/11 R, 11.5, 10 C, 11 L

[56] References Cited
UNITED STATES PATENTS
3,406,619   10/1968   Rentschler .................. 95/10 C
3,498,192   3/1970   Tadashi Ito et al. .......... 95/11 X Primary Examiner—Samuel S. Matthews
Assistant Examiner—Robert P. Greiner
Attorney—Watson, Leavenworth and Kelton ABSTRACT: An autoflash switching system and device for use in automatic photoelectric exposure control cameras (EE cameras) wherein the camera is automatically switched from its autophotography position to its flashphotography position upon attachment of a flashgun to an accessory shoe.

PATENTED JAN 11 1972 3,633,476

AUTOFLASH SWITCHING DEVICE FOR CAMERA

The present invention relates to an autoflash switching system and device for use in automatic photoelectric exposure control cameras (EE cameras) and more particularly to an autoflash switching device for cameras of the type described in which, upon attachment of a flashgun to an accessory shoe, the camera is automatically switched from its autophotography position to its flash photography position.

In conventional EE cameras, in order to set the camera to its flash photography position from its autophotography position, a switch in the exposure meter circuit is switched by rotating an autoflash or automanual switching ring. That is, upon rotation of the switching ring to its flash photography position, a variable resistor interconnected with a distance scale ring is connected to the exposure meter circuit so that exposure is automatically controlled when an object to be photographed is focused upon rotation of the distance scale ring.

In brief, the present invention provides an autoflash switching device by which a camera is switched from its autophotography position to its flash photography position automatically upon attachment of a flashgun to an accessory shoe and the exposure is automatically determined by focusing an object through use of the distance scale ring. One of the advantages provided by the present invention is that it is not required to operate the switching ring in flash photography so that flash photography may be rapidly and easily made.

The above and other objects, advantages and features of the present invention will become more apparent from the following description taken in conjunction with the accompanying drawing, in which.

Figure 1:
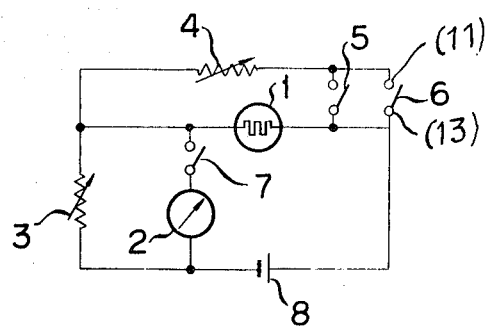
FIG. 1 is a circuit diagram according to the present invention.

FIG. 1 shows a circuit diagram of a switching device according to the present invention in which reference numeral 1 designates a photoconductor element (For example, CdS), 2 is an ammeter, 3 is a variable resistor for setting the film sensitivity or guide number, 4 is another variable resistor interconnected to a distance scale ring, 5 is a switch interlocked with an autoflash switching ring, 6 is a contact provided by an accessory shoe of a camera, 7 is a power source switch, and 8 is a battery.

To effect automatic photography by a camera having an exposure meter circuit as shown in FIG. 1, the autoflash switching ring is set to AUTO so that the switch 5 is opened, thereby disconnecting the variable resistance 4 from the circuit. Therefore, as in the case of a conventional EE camera, the prevailing brightness is indicated by the angle of rotation of the pointer of the exposure meter. In this case, the resistance of the variable resistor 3 may be varied in accordance with the sensitivity of the film by rotating the film sensitivity selection ring so that the correct exposure suitable for the sensitivity of the loaded film can be ensured.

In the case of flash photography, a flashgun is mounted upon the accessory shoe so that the contact 6 is closed through the contacts of the flashgun, thereby connecting the variable resistor 4 to the exposure meter circuit. It will be seen that it is not required to close the switch 5 by rotating the autoflash switching ring. In this state the distance to an object is set by the distance scale ring so that the exposure can be automatically determined. When flashbulbs having the same guide number are used for the flashgun, the variable resistor 3 may be set to a magnitude which is determined by both of the film sensitivity and the guide number. In flash photography, the object is generally dark so that even if the photoconductor 1 is in the circuit as shown in FIG. 1, it will not adversely affect the indication of the pointer in the meter since the resistance of the photoconductor element 1 is very high.

Figure 2:
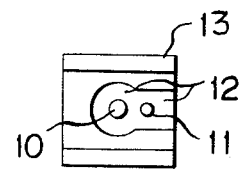
FIGS. 2 to 4 are schematic views showing an accessory shoe of the switching device of the present invention.
Figure 3:
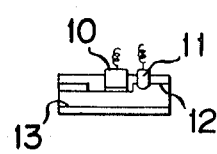
Figure 4:
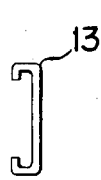

FIGS. 2 to 4 show one embodiment of a flashgun and its accessory shoe specially designed for use with the autoflash switching device of the present invention. In the figures, reference numeral 9 denotes a flashbulb, 10 is a flash contact and 11 is a switching contact which also corresponds with contact 6 in FIG. 1. 12 is an insulating plate, 13 is a shoe body, 14 is a contact of the flashgun, matable with contact 10, 15 is a contact for switching to the flashgun, matable with contact 11 and 16 is a leg portion of the flashgun at least one portion of which is made of an electrically conductive material for contact with the accessory shoe 13.

Figure 5:
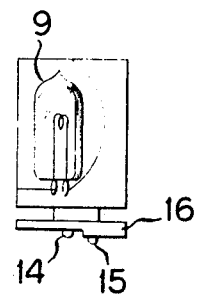
FIG. 5 is a schematic view of a flashgun specially designed for use with the autoflash switching device of the present invention.

The flashgun shown in FIG. 5 is electrically connected to the camera without the use of a cord so that when this gun is mounted on the shoe, the flashgun contact 14 engages the contact 10, while the contact 15 engages the contact 11 and the metallic portion of the leg 16 is placed in contact with the accessory shoe, thereby establishing the flash circuit and exposure meter circuit.

Figure 6:
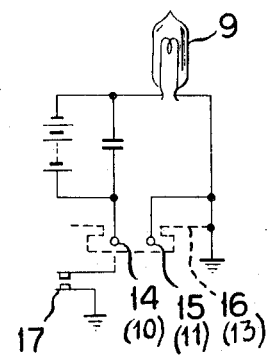
FIGS. 6 and 7 include circuit diagrams of flashguns specially designed for use with the device of the present invention.
Figure 7:
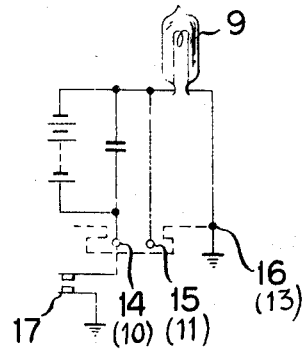

FIGS. 6 and 7 show the internal circuits within the flashguns, respectively. In the embodiment shown in FIG. 6, the switching contact 15 is adapted to connect to the metallic portion of the leg 16 within the flashgun. In the embodiment shown in FIG. 7, the contact 15 is connected to the metallic portion of the leg 16 through the flashbulb. Reference numeral 17 indicates flash contacts of the shutter. In the case of the embodiment shown in FIG. 7, when the circuit is established by attaching the flashgun to the shoe, check of the flashbulb may be effected by the movement of the pointer of the ammeter.

Next the mode of flash photography by a conventional flashgun attached to the camera having the autoflash switching device of the present invention will be described. By rotating the autoflash switching ring to FLASH, the switch 5 in FIG. 1 is closed so that the exposure is automatically determined by the variable resistor 4 interlocked with the distance scale ring. In this case, the resistance of the variable resistor 3 may be set by a guide number ring disposed separately. In this case, the device of the present invention is required to be modified such that the switching contact will not electrically contact the leg portion of the flashgun.

According to the autoflash setting device of the present invention, one may switch from automatic photography to flash photography merely by attaching to the accessory shoe the flashgun specially designed for this purpose as described above. It is therefore obvious that flash photography can be made easily and rapidly so that the simple and advantageous camera operation can be ensured.

What is claimed is:

1. A system providing automatic flash photography exposure control for a camera comprising, in combination, a flashgun receptor including a conductive member connected to the camera housing, an exposure control circuit including a photoconductor and a resistor variably settable in accordance with camera focusing, first terminals of said photoconductor and said resistor being connected together, first and second contact elements insulatively supported in said conductive member, said first contact element being connected to the resistor second terminal and said second contact element being connected to said camera housing through the camera shutter flash contacts, said conductive member being connected to the photoconductor second terminal, said flashgun including a power supply, a flashbulb filament and a conductive base insulatively supporting third and fourth contact elements, said conductive base being matable with said receptor conductive member for providing engagement of said first and third contact elements and engagement of said second and fourth contact elements, said power supply and said filament being series connected between said fourth contact element and said conductive base, said third contact being connected to said conductive base.

2. The system claimed in claim 1 wherein said exposure control circuit comprises a series circuit including said photoconductor, an ammeter and a battery and a further resistor variably settable in accordance with film sensitivity and connected in parallel with said ammeter.

3. The system claimed in claim 1 wherein said third contact element is connected directly to said conductive base.

4. The system claimed in claim 1 wherein said third contact element is connected to said conductive base through said filament.

* * * * *

UNITED STATES PATENT OFFICE
CERTIFICATE OF CORRECTION

Patent No. 3,633,476　　　　　　　　　　Dated January 11, 1972

Inventor(s)　Mutsunobu Yazaki et al.

It is certified that error appears in the above-identified patent and that said Letters Patent are hereby corrected as shown below:

Item [73], Title page, "Cannon Kabushiki Kaisha" should read
　　　　　　　　　　　--Canon Kabushiki Kaisha--.

Signed and sealed this 11th day of July 1972.

(SEAL)
Attest:

EDWARD M. FLETCHER, JR.　　　　ROBERT GOTTSCHALK
Attesting Officer　　　　　　　　Commissioner of Patents